US005099512A

United States Patent [19]

Shigami et al.

[11] Patent Number: 5,099,512

[45] Date of Patent: Mar. 24, 1992

[54] COMMUNICATION TERMINAL DEVICE

[75] Inventors: Akihiko Shigami, Hino; Toshifumi Yamamoto, Kanagawa; Shuji Yoshida, Tama, all of Japan

[73] Assignee: Kabushiki Kaisha Toshiba, Kawasaki, Japan

[21] Appl. No.: 409,412

[22] Filed: Sep. 19, 1989

[30] Foreign Application Priority Data

Sep. 22, 1988 [JP] Japan ................................ 63-238006
Jan. 13, 1989 [JP] Japan ................................ 1-3067

[51] Int. Cl.[5] ................................ H04M 1/00

[52] U.S. Cl. ................................ 379/357; 379/355; 379/356; 379/216

[58] Field of Search ............... 379/355, 356, 357, 216, 379/354, 206

[56] References Cited

U.S. PATENT DOCUMENTS

| | | | |
|---|---|---|---|
| 4,164,630 | 8/1979 | Brodbeck | 379/357 |
| 4,409,440 | 10/1983 | Brodbeck | 379/357 |
| 4,759,056 | 7/1988 | Akiyama | 379/357 |
| 4,815,125 | 3/1989 | Al-Rani | 379/357 |
| 4,868,849 | 9/1989 | Tamaoki | 379/357 |
| 4,879,744 | 11/1989 | Tasaki et al. | 379/357 |
| 4,914,691 | 4/1990 | Berger | 379/357 |

*Primary Examiner*—James L. Dwyer
*Assistant Examiner*—Jhancy Augustus
*Attorney, Agent, or Firm*—Oblon, Spivak, McClelland, Maier & Neustadt

[57] ABSTRACT

Facsimile equipment includes an image scanner for reading image information from an transmit original, a coder for coding the image signal to produce image data, a modulator/demodulator coupled to the coder and to a line via a network control unit, a decoder for decoding image data transmitted over the line to reproduce an image signal, a printer for printing an image on a recording paper in response to the reproduced image signal, and a dialer coupled to the network control unit for producing dial pulses corresponding to a dialing number. The facsimile equipment further includes a keyboard, a memory, and a card reader. The keyboard includes ten keys for entering dial numbers for usual dialing operation and memory keys for reading dial numbers stored in the memory for dialing by a single key operation. The memory stores dial numbers in the form of a table accessed by the types of the card and the memory key. The card reader reads from a card loaded into the facsimile equipment information representing the type of the card. Dialing number is read out from the table in accordance with the memory key operated and the type of the card. The dialer produced dial pulses in response to the read dialing information.

16 Claims, 6 Drawing Sheets

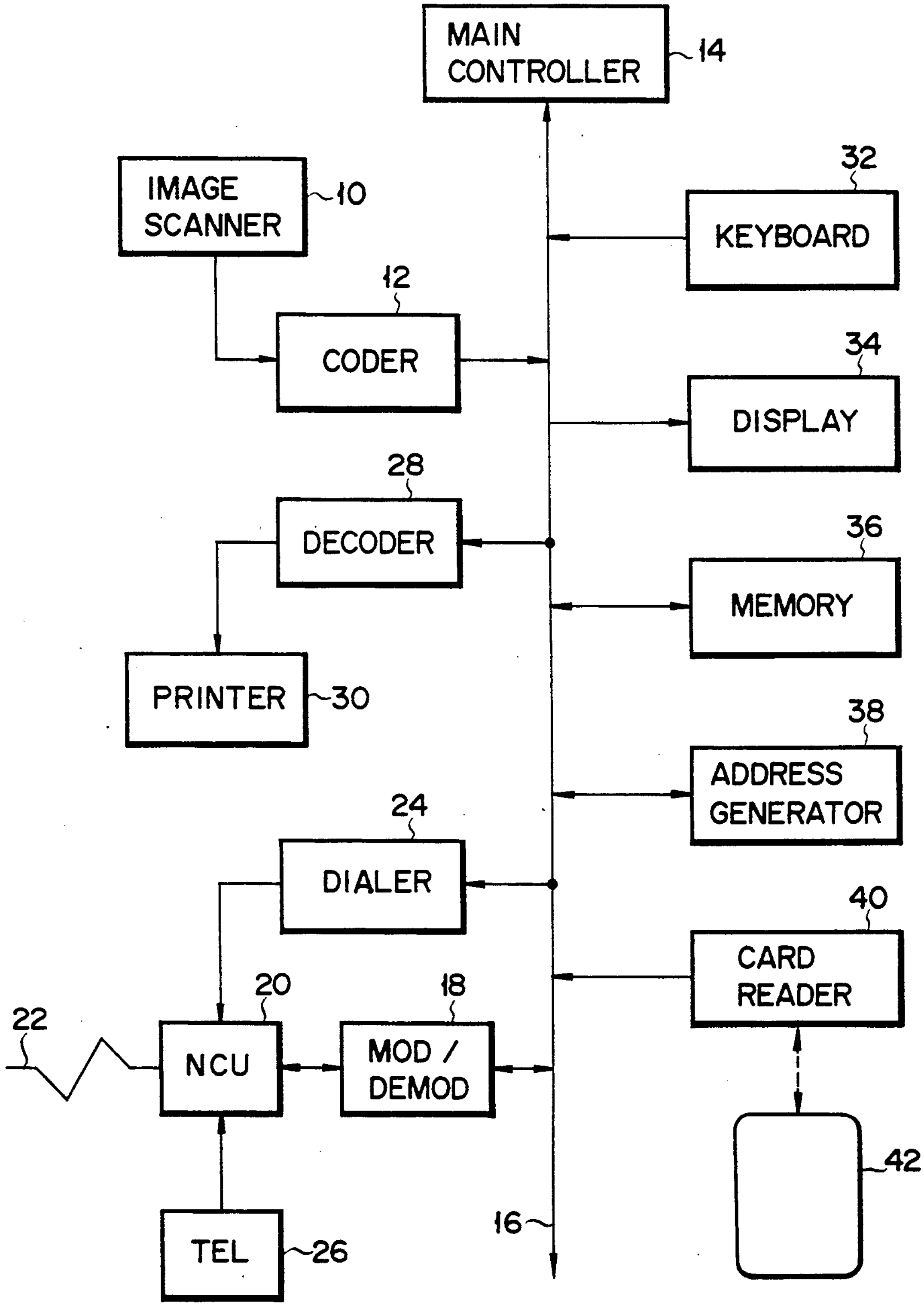
F I G. 1

| KEY \ CARD | NONE | # 1 | # 2 | . . . |
|---|---|---|---|---|
| A | 031234567 (HEAD OFFICE) | 0119876543 (SAPPORO) | 0696261064 (MORIOKA) | . . . |
| B | 0472119999 (CHIBA) | 0451357902 (YOKOHAMA) | 0229712236 (SENDAI) | |
| C | 0486301000 (OOMIYA) | 0521233210 (NAGOYA) | 0286968194 (UTSUNOMIYA) | |
| D | 0552491111 (KOFU) | 0753380934 (KYOTO) | 038410012 (UENO) | |
| E | 033047777 (SETAGAYA) | 063027711 (OOSAKA) | 033554400 (SHINJUKU) | |
| F | 0292250111 (MITO) | 0862246802 (OKAYAMA) | 0425251040 (TACHIKAWA) | |
| G | 0273441111 (TAKASAKI) | 0829012345 (HIROSHIMA) | 0426827755 (HACHIOJI) | |
| H | 0557644111 (ATAMI) | 0932513731 (KOKURA) | 0444011746 (KAWASAKI) | |
| I | 032111234 (KATSUSHIKA) | 0928518046 (HAKATA) | 0467827755 (OOFUNA) | |
| J | 0427221111 (MACHIDA) | 0992413331 (KAGOSHIMA) | 034414700 (SHINAGAWA) | |

FIG. 2

COMMUNICATION TERMINAL DEVICE

BACKGROUND OF THE INVENTION

1. Field of the Invention

The present invention relates to a communication terminal device, such as a telephone equipment or a facsimile equipment, which incorporates a memory for storing dial numbers of the addresses and a function of dialing by a single operation of a predetermined operating member corresponding to the stored dial number.

2. Description of the Related Art

Many of recent communication terminal devices are provided with the above-mentioned dialing function in order to simplify the dialing operation. To implement such function, it is necessary to provide keys, buttons, or switches for addressing the memory in addition to ten keys for entering dial numbers and to store the dial numbers of the respective addresses into a memory in a one-to-one correspondence with the addressing keys, buttons, or switches. A desired dial number is read out from the memory in response to the depression of the addressing key, thereby to dial the desired number by a single operation of the addressing key. According to the function, to dial the number, one addressing key has only to be depressed without the necessity of keying in each of digits of the dial number, thus shortening the keying-in time and avoiding entering an erroneous dial number. Hence, the more the dial numbers which are stored in the memory, the greater the convenience of the dialing operation. An increase of the memory capacity is not a serious problem. However, an increase of addressing keys with an increase of dialing numbers to be stored will provide a great difficulty in making a communication terminal device small. With conventional communication terminal devices in which one addressing key is assigned to one dial number, there is a problem that the number of dial numbers which can be stored in a memory is restricted to the number of addressing keys.

SUMMARY OF THE INVENTION

It is an object of the present invention to provide a small communication terminal device which permits an increase of addresses each of which can be dialed by a single operation without an increase of the number of operating members adapted for dialing the address by a single operation and provided in addition to digit entering members for entering digits of dial numbers.

It is another object of the present invention to provide a small communication terminal device which permits an increase of addresses each of which can be dialed by a single operation without an increase of the number of operating members adapted for dialing the address by a single operation and provided in addition to digit entering members for entering digits of dial numbers, by assigning each of the operating members to a plurality of addresses in advance and actually assigning the operating member to any one of the address with easy operation.

It is still another object of the present invention to provide a dialing method for use in a communication terminal device, which allows any one of dial numbers stored in a memory in advance to be read out with an easy operation without entering whole digits of a dial number at each dialing operation.

According to the present invention, there is provided a communication terminal device comprising a memory for storing a large number of dial numbers, the dial numbers being divided into several groups and stored for each of groups; operating members for respectively designating relative memory addresses of the dial numbers each designating a relative location of the dial number in the group; a card loading section into which a removable card is loaded which bears an identification information representing one of the groups of the dial numbers and has address informations written on its surface which correspond to the dial numbers included in the group represented by the identification information; an address generator for generating a read address for reading one of the dial numbers from the memory in accordance with the group represented by the identification information of the removable card loaded into the card loading section and the relative location designated by one of operating members operated; and a dialer for generating the dial pulses based on the dial number read out from the memory.

According to the communication terminal device, each of the operating members can be assigned to a plurality of dial numbers, and each of the operating members is selectively assigned to a single dial number in accordance with the identification information of a card loaded into the card loading section. Therefore, a desired dial number can be read out by a single operation of the corresponding operating member.

In addition, according to the present invention, a dialing method for use with a communication terminal device which comprises a memory for storing dial numbers, the dial numbers being divided into several groups and stored for each of groups in correspondence with the operating members, the dialing method comprising the steps of reading an identification information representing one of the groups of the dial numbers from a removable card; reading, when one of the operating members is operated, a dial number from the memory in accordance with the operated operating member and the group represented by the identification information read; and generating the dial pulses based on the dial number read out from the memory.

According to the dialing method, dial numbers are stored in a memory for each group and in correspondence with the operating members, the group is selected by the identification information that a loaded card bears, and one of the dial numbers in the selected group is read out from the memory by a single operation of the operating member.

BRIEF DESCRIPTION OF THE DRAWINGS

FIG. 1 is a block diagram of a facsimile equipment serving as a communication terminal device according to a first embodiment of the present invention;

FIG. 2 illustrates one example of a table of dial numbers stored in the memory of FIG. 1;

DETAILED DESCRIPTION OF THE PREFERRED EMBODIMENTS

Figure 3:
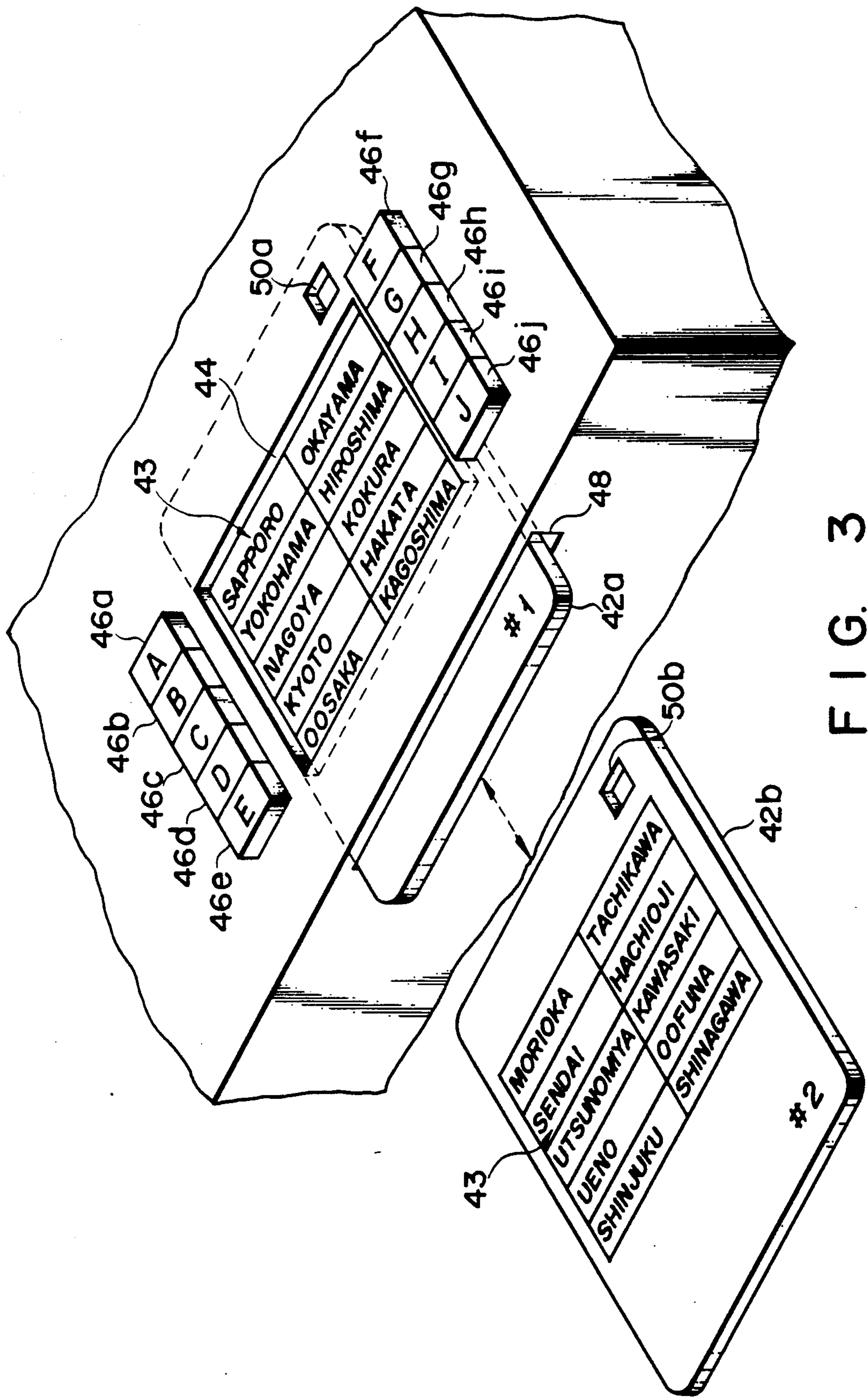
FIG. 3 illustrates an outer appearance of the main portion of the operation panel of the first embodiment.

Referring now to FIG. 1, an image scanner 10 reads image information of a transmit original (not shown) placed in a facsimile equipment and provides a read image signal to a coder 12. Coder 12 encodes the input image signal to produce image data. The image data is supplied to a modulator/demodulator (modem) circuit 18 via a bus line 16 of a main controller 14 and then subjected to modulation for transmission the image data to a line 22 through a network control unit (NCU) 20. Main controller 14 is formed of a microcomputer which has control functions for reading and recording the image and control functions for receiving and transmitting the image data. To network control unit 20 are also connected a dialer 24 for producing dial pulses representing a dial number of the transmission address to transmit the original and a telephone equipment 26. Dialer 24 is connected to main controller 14 via bus line 16.

On the other hand, image data transmitted to the facsimile equipment over line 22 is entered via network control unit 20 into modulator/demodulator circuit 18 for demodulation and then into a decoder 28 via bus line 16 of main controller 14. Decoder 28 decodes the input image data to reproduce an image signal. The reproduced image signal is entered into a printer 30 and output onto a recording paper as an transmitted image.

To bus line 16 of main controller 14 are also connected a keyboard 32, a display 34, a memory 36, an address generator 38, and a card reader 40. Keyboard 32 and display 34 are mounted on the operation panel of the facsimile equipment. Keyboard 32 comprises numerous key switches which include ten keys for entering digits of dial numbers for usual calling or storing dial numbers in memory 36 and memory keys for calling dial numbers previously stored in memory 36 for calling by a single key operation. In stead of the key switches other operating members, such as push-button switches, may be used. Memory 36 stores a table representing a correspondence between dial numbers or addresses if necessary which are used for dialing by a single key operation and the respective memory keys. It is to be noted here that, as opposed to prior arts, each of the memory keys is assigned to a plurality of dial numbers. That is, the dial numbers are classified into a plurality of groups each including the dial numbers which equal in number to the memory keys and one dial number in each group is assigned to one memory key. For this reason, the memory keys are adapted to designate not absolute addresses of the memory but relative addresses in each group of the dial numbers.

Card reader 40 reads an information representing the type of the card 42 inserted into a slot of the operation panel of the facsimile equipment The type of the card corresponds to the above group of the dial numbers. That is, as shown in FIG. 2, a table of dial numbers is stored in memory 36, which can be accessed according to types of cards and memory keys. Although not only dial numbers but also addresses are stored in this example, the addresses need not necessarily be stored. In this manner a plurality of dial numbers are assigned to each of memory keys and the type of the card allows one of the dial numbers to be selectively assigned to the memory key. Also, with no card inserted, a given group of dial numbers are assigned to the memory keys.

FIG. 3 illustrates the outer appearance of the main portion of the operation panel. As described above, a plurality of cards 42*a*, 42*b*, . . . are prepared to determine the assignment of dial numbers to memory keys. The cards are provided with identification holes 50*a*, 50*b*, . . . representing the types of the cards in positions at their tips which differ from card to card. On the surface of each card are written addresses 43 corresponding to the dial numbers which belong to the group represented by the type of the card. On the operation panel are a window 44 which is opened so that addresses 43 may be viewed when card 42 is inserted into slot 48 and a plurality of memory keys 46*a* to 46 (ten memory keys in this example) on both sides of the window. Since the keys are arrayed in five rows and two columns which sandwich the window 44, the addresses on each card also are written in five rows and two columns correspondingly. Card reader 40 of FIG. 1 (not shown in FIG. 3) is provided at the end of card slot 48 to detect the positions of the identification holes. As can be seen, on those portions of each card which are placed adjacent to memory keys 46*a* to 46*j* when the card is properly inserted into slot 48 addresses that respectively correspond to the memory keys are written. Even if a card is replaced, therefore, the correspondence of the memory keys with addresses is quite obvious to the operator.

Figure 4:
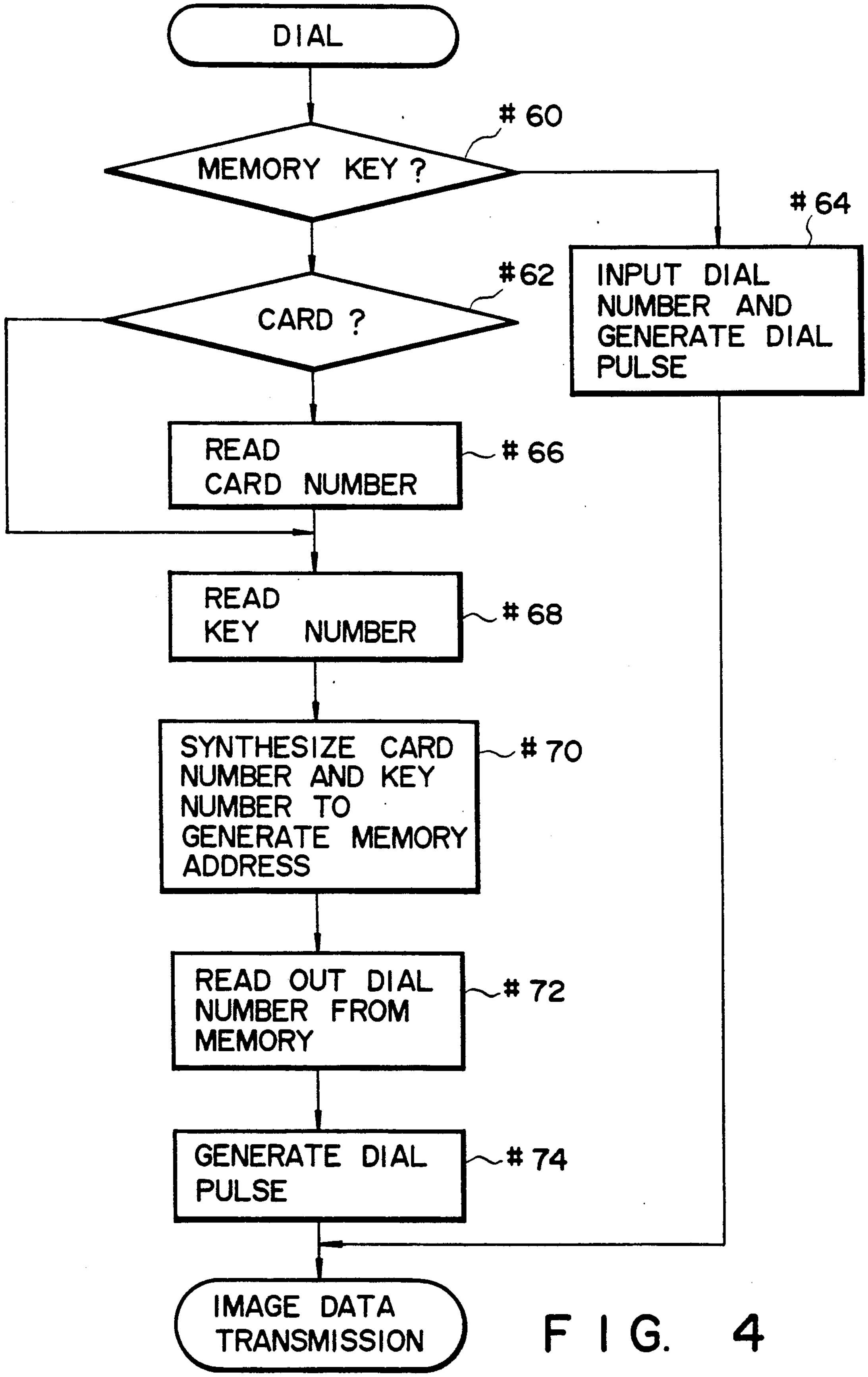
FIG. 4 is a flowchart of a dialing operation of the first embodiment.

Next, the dialing operation of the facsimile equipment will be described with reference to a flowchart illustrated in FIG. 4. In step #60, it is determined whether one of memory keys 46 is operated or not. When the operation of a memory key is detected, it can be determined that dialing by a single key operation is requested. In step #62, it is determined whether card 42 is inserted into slot 48 or not. When the operation of a memory key is not detected, it can be determined that usual dialing is requested which requires operating ten keys the number of times equal to the number of digits of a dial number In step #64, therefore, the dial number is entered by use of ten keys and corresponding dial pulses are generated from dialer 24, terminating the dialing operation.

When the insertion of card 42 is detected in step #62, the position of identification hole 50 is detected by card reader 40 in step #66, thereby to detect a type of the card (card number). When the card is not detected, step #66 is not carried out. The type of operated memory key 46 (key number) is detected in step #68. In step #70, a read address of the memory is generated for one of dial numbers in the dial number table stored in memory 36 that corresponds to the combination of the type of the card type and the type of the memory key. In step #72, the dial number is read out from memory 36 using the generated memory address. For verification the dial number is visually displayed on display 34 along with characters representing the corresponding address. In step #74, dial pulses are generated from dialer 24 with the result that the dialing operation terminates. Image data is then transmitted to line 22 by network control unit 20. According to the present embodiment, memory keys 46a to 46j are assigned to a predetermined group of dial numbers according to the type of card 42 inserted into card slot 48 and moreover they can be assigned to another group of dial numbers when card 42 is replaced with another card. With a smaller number of memory keys used, therefore, dial numbers which is several times in number the memory keys can be called by a single key operation. For example, when card 42a of "#1" type is loaded into card slot 48 and memory key of "F" type is pressed, a dial number of "0862246802" for OKAYAMA is read out from the dial number table shown in FIG. 2 which corresponds to the card type "#1" and the memory key type "F".

As described above, according to the first embodiment of the present invention in which one of plural dial numbers assigned to one memory key is automatically read out according to the identification information read from a removable card loaded into the communication terminal device, there is provided a small communication terminal device which can easily dial a large number of addresses by use of a small number of memory keys. Since the type of the card can be identified, the communication terminal device (facsimile equipment, in particular) may be used in such a way that communication modes vary with the types of cards. Furthermore, in a case where the communication terminal device is used by plural users, and each of the users should be supervised for the number of transmit originals and communication rate, if a card is issued to each of the users, then such supervision will easily be effected by checking each of the cards.

Figure 5:
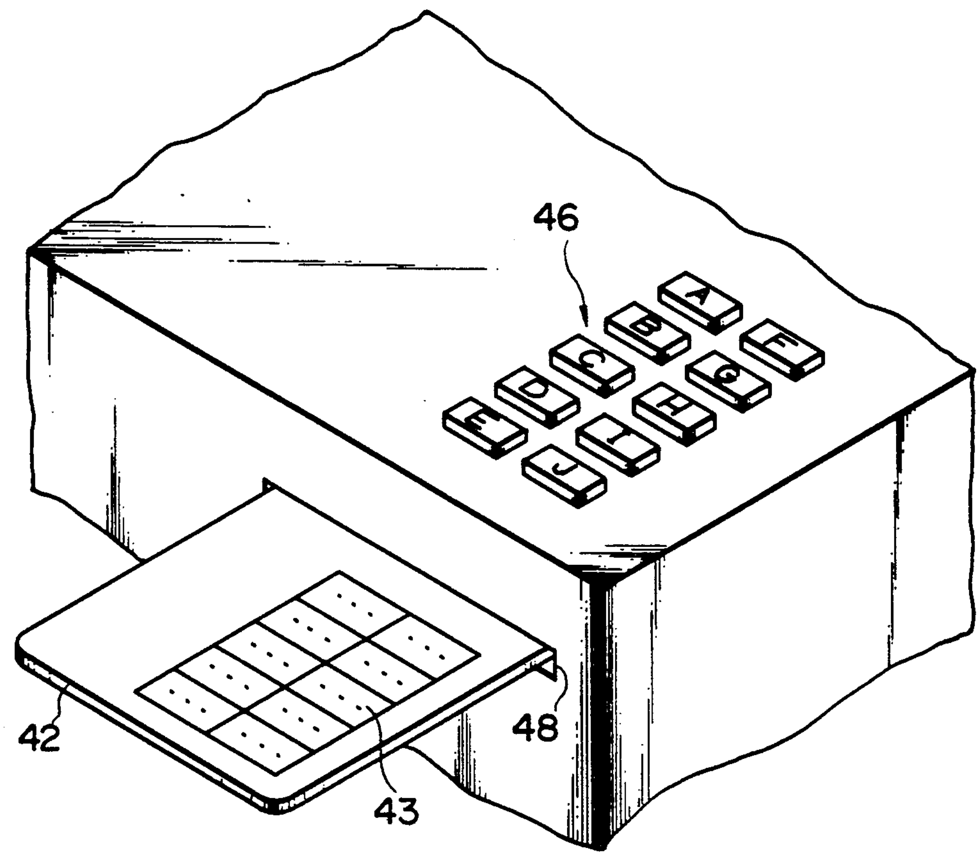
FIG. 5 illustrates an outer appearance of the operation panel of a facsimile equipment according to a second embodiment of the present invention.

Next, a second embodiment of the present invention will be described. FIG. 5 illustrates an outer appearance of the operation panel of the second embodiment. In the second embodiment, no provision is made for a window opened in such a way that addresses 43 written on the surface of card 42 ma be viewed when it is inserted into slot 48 properly. Memory keys 46 are arrayed in five rows and two columns, corresponding keys in two columns being adjacent to each other. A card 42 can be inserted into slot 48 only halfway as compared with the first embodiment. Addresses 43 corresponding to dial numbers are written on that portion of the card which protrudes to outside.

Figure 6:
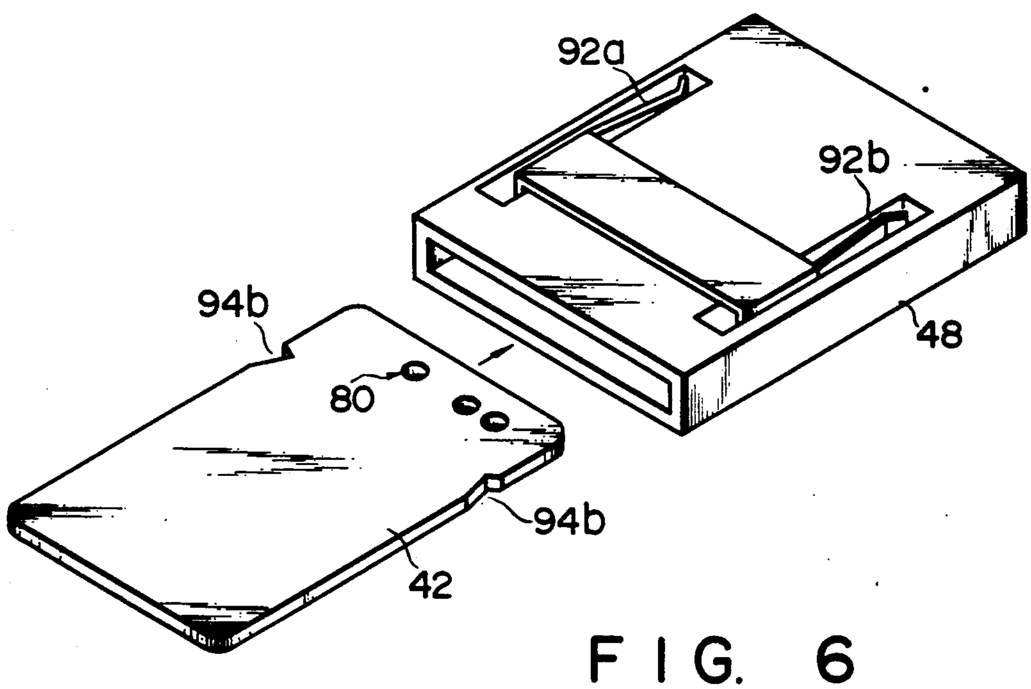
FIG. 6 is a perspective view of a card inserting section of the second embodiment.
Figure 7:
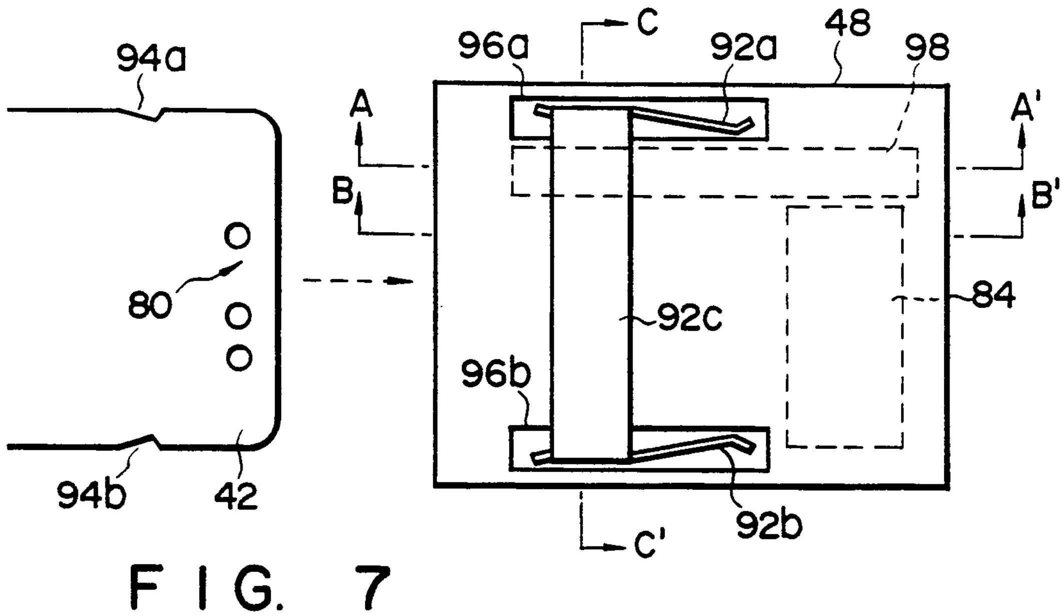
FIG. 7 illustrates a plan structure of the card inserting section of FIG. 6.
Figure 8:
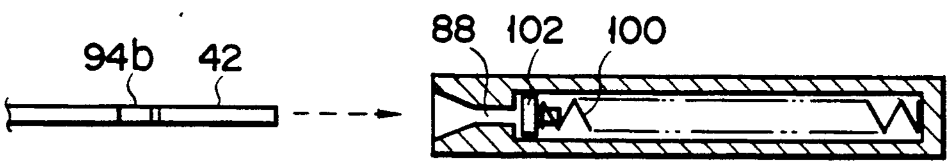
FIG. 8 is a sectional view taken along a line A—A' of FIG. 7.
Figure 9:
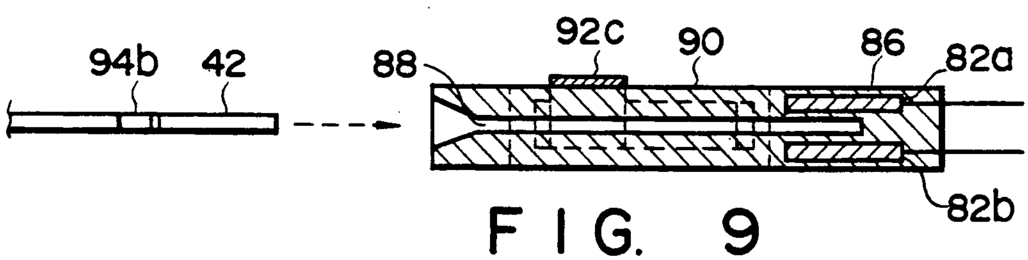
FIG. 9 is a sectional view taken along a line B—B' of FIG. 7.
Figure 10:
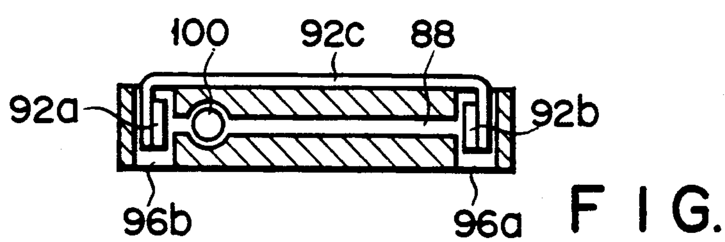
FIG. 10 is a sectional view taken along a line C—C' of FIG. 7.

The card inserting section of the second embodiment will be described with reference to FIGS. 6 to 11. FIG. 6 illustrates a perspective view of the card insertion section, FIG. 7 is its plan view, and FIGS. 8 to 10 are sectional views taken along a line A—A', a line B—B' and a line C—C' of FIG. 7. In this embodiment the types of cards are represented by a combination of presence and absence of identification holes 80. Therefore, a large number of types of cards can be represented with a small number of identification holes. As shown in FIG. 9, at the end of card slot 48 there is provided a holder 86 for holding a transmission type optical sensor 84 comprising light emitting elements 82a and light receiving elements 82b which are opposed to each other. A guide 90 is formed integral with holder 86, which has a slit 88 formed to guide card 42 to the position of optical sensor 84. The end of slit 88 reaches the inside of holder 86. As shown in FIGS. 6 and 7, there are provided leaf springs 92a and 92b which resiliently holds card 42 at its both sides when it is set in reading position of optical sensor 84. Card 42 is provided with notches 94a and 94b with which leaf springs 92a and 92b engage. For this reason, card 42 is guided with slit 88 to be accurately placed in the reading position of optical sensor 84 and held by leaf springs 92a and 92b. Thus no misregistration of card 42 will occur because of vibration. Leaf springs 92a and 92b are attached to through holes 96a and 96b formed in guide 88. Leaf springs 92a and 92b are connected to each other by a connecting member 92c. Leaf springs 92a and 92b are each formed to have a bend at its point and are connected to connecting member 92c with their bends directed toward the card as shown.

With such a structure of the card insertion section, however, the operator has to decide whether the card has been inserted in the correct position only by a touch of engagement of the leaf springs with the notches of the card. For this reason, before inserting card 42 fully the operator may sometimes misjudge that the card has been inserted fully. In this case, card 42 is placed in the so-called half inserted state in which it is not properly placed in the reading position of optical sensor 84. As a result, an undesired dial number would be read from the memory to call a wrong address due to the wrong identification of the type of the card.

In the second embodiment, therefore, provision is made for avoiding such half insertion of a card. That is, there is provided, at a side portion of slit 88, a housing 98 for a coiled spring which extends, in the direction in which the card is inserted, from the vicinity of the entrance of slit 88 toward the optical sensor 84. In this housing 98 a coiled spring 100 is housed which is biased so as to eject a card. The force of coiled spring 100 to eject a card is set smaller than the force of leaf springs 92a and 92b to engage with the notches 94b. To a tip of coiled spring 100 is connected a slider 102 of circular section so that the coiled spring may be compressed without deformation when card 42 is inserted.

Figure 11:
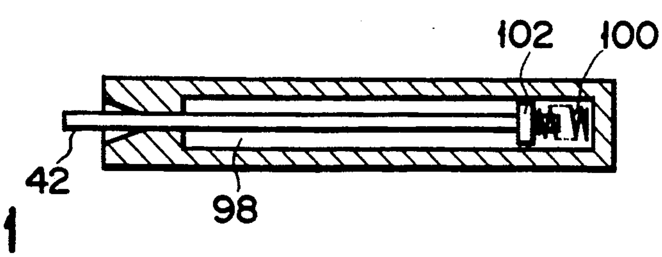
FIG. 11 is a sectional view taken along a line A—A' of FIG. 7 illustrating the compressed state of a coiled spring when the card is inserted.

When card 42 is forced into slit 88 and then guided to the reading position of optical sensor 84, leaf spring 92a and 92b engage with notches 94a and 94b of the card so that card 42 is fixed by the spring force. As described above, since the force of coiled spring 100 is set smaller than the force of leaf springs 92a and 92b, coiled spring 100 is simply compressed as shown in FIG. 11 and thus card 42 is not ejected.

However, when card 42 is not inserted to the reading position of optical sensor 84, that is, when the operator releases the card before notches 94a and 94b of card 42 engage with leaf springs 92a and 92b, the card is ejected by the force of coiled spring 100. Therefore, the operator can admit that the card is not inserted properly, thus avoiding the half insertion state in which the card is away from the reading position of optical sensor 84. Hence, wrong determination of the type of the card and calling wrong dial numbers can be prevented. Furthermore, according to the embodiment, card 42 which is placed in the reading position of optical sensor 84 can be ejected automatically by pulling the card slightly such that the notches are disengaged from the leaf springs, thus facilitating ejection of cards.

The present invention is not limited to the embodiments described above and may be modified in various ways. For example, in addition to facsimile equipment described above, the present invention is adaptable to telephone equipment, telex equipment, data communication terminal devices, and so on. As the identification information representing the type of the card, notches, marks which reflect or absorb light, marks with magnetization or transmissive windows may be used in place of the holes described above. Writing addresses on cards is not necessarily required. Alternatively, address information may be recorded on cards electronically and may be reproduced for display in response to the depression of a memory key. In addition, signals from suitable input devices, such as key switches, may be used to select the group of the dial numbers to be assigned to memory keys instead of by using the card. Although, in the second embodiment, the positioning of a card in the lateral direction relative to the direction in which the card is inserted is effected by the guide (slit), the card may be ejected by use of a spring not shown in case where the card is set shifted laterally. As an alternative to the coiled spring serving as card ejecting member, another type of spring may be used. Although, in the second embodiment, a card is hold by the force of the card holding leaf springs in the case where it is set properly, provision may be made for locking the coiled spring when it is compressed over a predetermined amount, instead of using the leaf springs.

What is claimed is:

1. A communication terminal device comprising:
- means for storing dial numbers which are divided into groups;
- card loading means having a slot into which is inserted a card bearing identification information representing of the groups and address information corresponding to the dial numbers included in said one of the groups, the slot comprising means for holding the card at a predetermined position with a first force and means for ejecting the card when the card is not held by said holding means with a second force which is lower than the first force;
- means for loading a card bearing an identification information representing one of the groups and an address information corresponding to the dial numbers included in said one of the groups;
- means for reading one of the dial numbers from said storing means in accordance with the group represented by the identification information board on the card loaded into said loading means and said plural dial numbers designated by said designating means; and
- means for dialing based on the dial number read from said storing means.

2. The communication terminal device according to claim 1, in which said designating means comprises a plurality of switches arrayed on both sides of an opening provided on a housing, and said loading means is provided under said opening such that, when the card is loaded, the address information on the card is viewed through said opening.

3. The communication terminal device according to claim 2, in which said address information is written in locations of the card which are adjacent to said switches.

4. The communication terminal device according to claim 1, in which said reading means includes sensor means for reading the identification information of the card, and said loading means includes holding means for holding the card with a predetermined force when the card is placed in the reading position of said sensor means and means for ejecting the card with force weaker than said predetermined force of said holding means.

5. The communication terminal device according to claim 4, in which said card bears optical identification information, and said sensor means comprises an optical sensor.

6. The communication terminal device according to claim 4, in which said holding means comprises first springs for holding the card at its sides, and said ejecting means comprises a second spring biased in the direction in which the card is ejected.

7. The communication terminal device according to claim 6, in which the card has notches with which said first springs are engaged when the card is placed in the reading position of said sensor means.

8. The communication terminal device according to claim 1, in which said reading means, when said card bears no identification information, reads one of the dial numbers from said storing means in accordance with a group corresponding to the no identification information.

9. The communication terminal device according to claim 1, in which said storing means stores address information corresponding to the dial numbers, and said reading means includes means for reading address information corresponding the read out dial number and means for displaying the address information.

10. A communication terminal device comprising:
- means for storing dial numbers which are divided into groups;
- means for designating plural dial numbers which are included in corresponding locations in all the groups;
- card loading means having a slot into which is inserted a card bearing at a first portion identification information representing one of the groups and at a second portion address information corresponding to the dial numbers included in said one of the groups, the card being inserted into the slot such that the first portion is inserted into the slot and the second portion remains outside the slot;
- means for detecting the identification information borne by the card;
- means for reading one of the dial numbers from said storing means, in accordance with the group represented by the identification information detected by said detecting means and said plural dial numbers designated by said designating means; and
- means for dialing based on the dial number read from said storing means.

11. The communication terminal device according to claim 10, in which said second designating means includes means for loading a card bearing an identification information representing one of the groups and means for reading the identification information from the card.

12. The communication terminal device according to claim 11, in which the card has address informations corresponding to the dial numbers included in the group represented by the identification information written thereon.

13. The communication terminal device according to claim 11, in which said loading means includes holding means for holding the card with a predetermined force when the card is placed in the reading position of said reading means and means for ejecting the card with force weaker than the predetermined force of said holding means.

14. The communication terminal device according to claim 13, in which said holding means comprises first springs for holding the card at its sides, and said ejecting means comprises a second spring biased in the direction in which the card is ejected.

15. The communication terminal device according to claim 14, in which the card has notches with which said first springs are engaged when the card is placed in the reading position of said sensor means.

16. A dialing method for use with a communication terminal device including a digit entering member for entering dial numbers, a memory for storing dial numbers, a plurality of operating members, and a card reader for reading, from a removable card on which addresses are written, an identification information representing the group of the dial number, said method comprising the steps of:

detecting whether or not the card is properly loaded into the card reader, ejecting the card when it is detected that the card is not properly loaded, and reading the identification information from the card when it is detected that the card is properly loaded;

dialing a dial number entered by said digit entering member when it is not detected that the card is loaded; and reading, when one of said operating members is operated and the card is loaded, a dial number corresponding to said operated operating member and the group represented by the identification information.

* * * * *